(12) United States Patent
Awada et al.

(10) Patent No.: US 6,831,970 B1
(45) Date of Patent: Dec. 14, 2004

(54) METHOD AND SYSTEM FOR REMOTE ACTIVATION OF A TELEPHONE PROFILE

(75) Inventors: Faisal M. Awada, Austin, TX (US);
Joe N. Brown, Austin, TX (US);
Richard D. Crowley, Austin, TX (US);
Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 09/666,273

(22) Filed: Sep. 21, 2000

(51) Int. Cl.[7] .............................................. H04M 3/42
(52) U.S. Cl. ........................... 379/201.01; 379/201.05; 455/456.4
(58) Field of Search ....................... 379/201.01, 201.05, 379/211.01, 211.02, 212.01, 215.01, 88.12, 88.13, 88.17; 455/456.4

(56) References Cited

U.S. PATENT DOCUMENTS

| | | | | |
|---|---|---|---|---|
| 4,611,094 A | * | 9/1986 | Asmuth et al. | 379/201.03 |
| 5,241,588 A | * | 8/1993 | Babson et al. | 379/201.03 |
| 5,629,978 A | * | 5/1997 | Blumhardt et al. | 370/271 |
| 6,009,333 A | * | 12/1999 | Chaco | 455/456 |
| 6,016,478 A | * | 1/2000 | Zhang et al. | 705/9 |
| 6,317,593 B1 | * | 11/2001 | Vossler | 455/414 |
| 6,457,132 B1 | * | 9/2002 | Borgendale et al. | 713/320 |
| 6,463,278 B2 | * | 10/2002 | Kraft et al. | 455/418 |
| 6,556,996 B1 | * | 4/2003 | Kovarik et al. | 707/10 |
| 2001/0049617 A1 | * | 12/2001 | Berenson et al. | |

* cited by examiner

Primary Examiner—William J. Deane, Jr.
(74) Attorney, Agent, or Firm—Mark S. Walker; Edmond A. DeFrank

(57) ABSTRACT

A method and system for remotely and automatically selecting and activating a profile of a telephone. In particular, a user defines telephone profile activation information and communicates this information to the telephone to activate a desired profile during a certain event. In a preferred embodiment, the present invention includes a calendar application whereby the user may input scheduling information and profile associations so that calendar information and profile associations are transmitted by the calendar application to the telephone and activated upon occurrence and for the duration of an event. In an alternate embodiment, the method of the present invention includes having the telephone update the calendar application. The preset invention is capable of working in different time zones by converting the calendar information into the current time zone of the telephone.

18 Claims, 4 Drawing Sheets

METHOD AND SYSTEM FOR REMOTE ACTIVATION OF A TELEPHONE PROFILE

BACKGROUND OF THE INVENTION

1. Field of the Invention

The present invention relates in general to telephones and more particularly to a method and system for remotely and automatically activating a profile of a telephone.

2. Related Art

In this modern world telephones provide a user with the ability to communicate with others almost anywhere in the world. Telephones include both landline telephones and mobile telephones (such as cellular telephones). Mobile telephones, which are becoming increasingly popular and ubiquitous communication devices, provide mobile two-way communication using a duplex radio that acts like a regular telephone. Most types of telephones have several functions and support many different types of features including three-way calling, conference calling, call waiting, call forwarding and voice mail.

One popular and useful feature for telephones is telephone profiles. Generally, a telephone profile is a collection of telephone functions and features that allows a user to control the behavior of their telephone. Thus, a user can generate a telephone profile by selecting from available telephone functions and features and associating those desired functions and features with the profile. By way of example, a user may define a meeting profile that uses the voice mail feature and a vibration function. When the meeting profile is activated (such as when the user is in a meeting) the user is notified of a high-priority incoming calls (as predetermined by the user) by the vibration of the telephone, while all other incoming calls are sent to voice mail. Several other telephone profiles that determine the behavior of the telephone during certain events may be defined by the user, including, for example, a vacation profile (whereby all incoming calls are sent to voice mail), a travelling profile (whereby incoming calls are forwarded to another telephone number) and a normal profile (whereby all incoming calls are received). The following profiles are merely example, and of course these telephone profiles may be uniquely defined and titled by each individual user based on available telephone functions and features. In addition, many telephones require that a prefix be dialed when the telephone is outside of a certain area, and the telephone can include a prefix function that enables the prefix (such as an area code) to automatically be included whenever a number is dialed.

A major problem (and inconvenience) with current telephones, however, is that to activate telephone profiles the user is required to manually intervene and select a desired profile. This means that the user must remember to deactivate a certain profile when it is no longer being used and to activate a more appropriate profile for the current situation. Unfortunately, this requires the user to keep track of which profile is currently active and remember to manually deactivate a profile and manually activate another more desirable profile when circumstances change. Because of the constant manual intervention required to keep the telephone profiles updated, the use can easily forget to activate the correct telephone profile suitable for the particular occasion.

Many telephones (particularly mobile telephones) are also small in size and accordingly have small keys with which to enter information. Due to the small size of the keys, a user can easily incorrectly enter profile information into the telephone. This may result in the user's telephone ringing at an inopportune time or a call being missed because the incorrect profile was active. For example, if the user is in a meeting and forgets to activate a meeting profile (that is predefined to send all incoming calls to voice mail), then an unimportant incoming call will cause the telephone to ring during the meeting. On the other hand, if the meeting is over but the user forgets to manually switch profiles from meeting profile to normal profile, then an important call may be missed. The high level of manual intervention, high potential for errors and effort required to ensure that the proper profile is activated can be quite frustrating, inconvenient and time-consuming for the user.

In addition to keeping the correct profile activated on his telephone, a user is often also using a calendar application to schedule events. In fact, a user will typically use his calendar application to schedule upcoming events for a time period (such as for an hour, a day or an entire week) and then manually activate a telephone profile before each event that is appropriate for the event. The calendar application may reside on, for example, a desktop computer, a notebook computer a personal digital assistant (PDA) or on the equipment of an online service provider. In general, calendar applications are organizational tools that enable the user to record and schedule events (such as appointments, meetings, dates, important tasks and lists). The user who is using both a calendar application and telephone profiles must enter an event (such as an meeting) twice: once in the calendar application and once on the telephone (to associate a profile with the event). This requires at least two manual interventions and results in a duplication of effort, a great waste of time, user frustration and a greater decrease in the efficiency of the user.

Accordingly, what is needed is a method and system that avoids unnecessary duplication of effort by allowing remote activation of a telephone profile. In addition, the method and system would allow a user to automatically select, based on a user's predetermined settings within a calendar-based application, the proper telephone profile for the particular occasion. Activation of the telephone could be accomplished by any remote communications means, for example, using a modem contained on the processing device where the calendar application resides, e-mail, telephone voice mail, digital messaging or a voice-response system. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention includes a method and system for remotely activating a profile of a telephone. In general, the present invention includes having a user input telephone profile activation information, transmitting the information to the telephone and automatically activating a desired telephone profile corresponding to an event based on the telephone profile activation information. In a preferred embodiment, the present invention includes a calendar application to receive and manage calendar information, associating a suitable telephone profile with the calendar information, transmitting these profile associations to the telephone and activating the desired profile at an appropriate time. After an event has expired (either due to cancellation or completion), a subsequent profile may be activated. In addition, an alternate embodiment of the present invention includes providing a means for the user to update profile and calendar information on the telephone and having that information transmitted to a remote profile activator (such as a calendar application).

The present invention avoids duplication of user effort by having the user schedule events on the remote profile activator (such as a calendar application residing on a computer) and having the remote profile activator automatically activate a predetermined telephone profile associated with an event on the telephone. Automatic activation of the telephone profile can be accomplished by any remote communications means, such as using a modem contained on the processing device where a calendar application resides, e-mail, telephone voice mail, digital messaging or a voice-response system. Because the user has predefined telephone profiles for certain types of events, the user only enters telephone profile activation information once in the remote profile activator and the application automatically will associate a suitable telephone profile to the event based on the user's preferences. Not only is duplication of effort eliminated, but the user no longer must remember to activate a suitable profile at several times during the day, thus eliminating user error and frustration and saving a great deal of time. In addition, the preset invention is capable of working in different time zones by converting the calendar information into the current time zone of the telephone. Thus, activation of telephone profiles is performed automatically and without the need for the user to constantly correlate an event with a telephone profile and manually activate the profile prior to each event.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
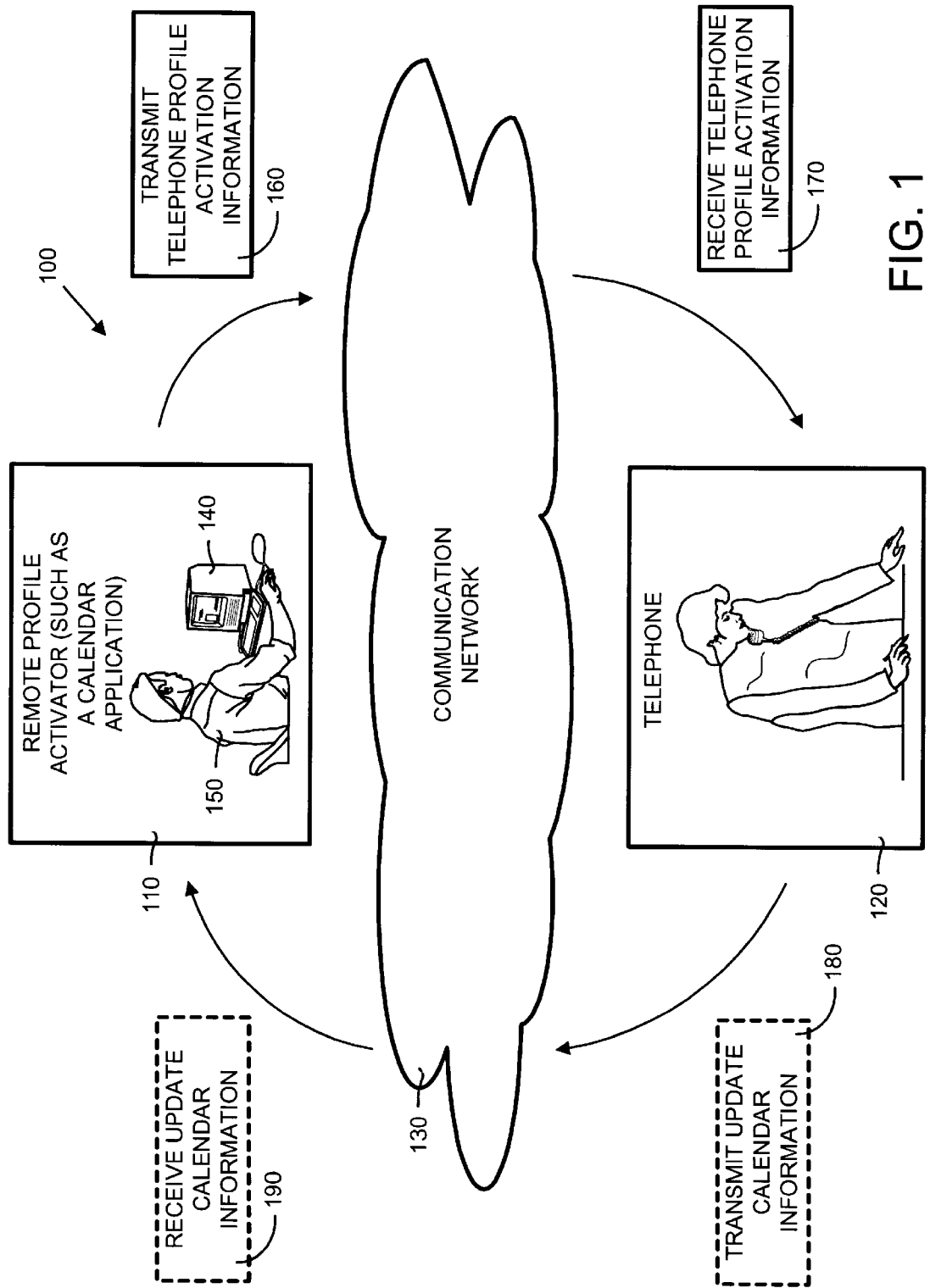
FIG. 1 is a general block diagram illustrating a system incorporating the present invention ad is shown for illustration purposes only.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The method and system of the present invention remotely and automatically activates a telephone profile. In a preferred embodiment, the profile of the telephone is activated by a calendar application. In this preferred embodiment, the user can schedule an upcoming calendar period (such as the upcoming week) and, based on predetermined settings, have the calendar application automatically activates a telephone profile corresponding to the event so that the telephone behaves as desired by the user during the event. For instance, a user can schedule a meeting in the calendar application and the application activates a meeting profile such that the telephone does not ring but instead vibrates when there is an incoming call. Alternatively, the user can define a meeting profile such that the ringer is turned off and all incoming calls are sent to voice mail. The calendar application transmits this telephone profile activation information to the telephone. Upon occurrence of the scheduled meeting, the telephone activates the associated profile and the telephone behaves in a predetermined manner during the meeting. Thus, the calendar application automatically directs which telephone profile is active at various times during a calendar period based on the schedule previously generated by the user in the calendar application. Moreover, the present invention can be used to activate and manage profiles for a plurality of telephones (such as a user's mobile telephone and office telephone).

The present invention provides several advantages over existing techniques. For example, manual invention is not required, because the calendar application automatically instructs the telephone which profiles to activate. Using the functions and features of the telephone, several different telephone profiles may be defined by the user. For example, a certain telephone profile may be activated automatically when the user is on vacation and a different profile may be activated automatically when the user is at work. In addition, the present invention supports time zone conversion, so that if the user schedules an event in a local time zone and the event occurs in a different time zone, the telephone adjusts for this and automatically activates the desired profile based on the proper time zone. The present invention avoids duplication of effort, because the user need only input a schedule once in the calendar application rather than twice (i.e., enter an event once in the calendar application and subsequently activate the profile on the telephone corresponding to the event). In addition, the invention alleviates constant manual intervention by the user (thus decreasing scheduling and profile activation errors), eliminates the need for the user to remember to constantly changes profiles on the telephone, and generally frees the user to concentrate on other tasks. This alleviation of the need to constantly manage and activate telephone profile greatly increases user efficiency and productivity and saves valuable time.

II. General Component Overview

FIG. 1 and the following discussion are designed to provide a brief, general description of a suitable environment in which the present invention may be implemented. It should be noted that FIG. 1 depicts only one of several ways in which the present invention may be implemented. For example, those skilled in the art will appreciate that the invention may be practiced using a variety of computer systems such as, for example, personal computers, server computers, hand-held devices, multiprocessor systems, microprocessor-based or programmable consumer electronics, network PCs, minicomputers and mainframe computers. In addition, several types of telephones (such as mobile telephones and landline telephones) that support telephone profiles may be used including analog system and digital systems.

As shown in FIGS. 1–5 for the purposes of illustration, the invention is embodied in a method and a system for remotely and automatically activating a profile on a telephone. FIG. 1 is a general block diagram illustrating a system incorporating the present invention and is shown for illustration purposes only. A telephone profile activation system 100 includes a remote profile activator (such as a calendar application) 110 and a telephone 120 in communication over a communication network 130. It should be noted that the remote profile activator 110 and the telephone 120 need not be in constant communication over the communication network 130. The remote profile activator 110 resides on a remote profile activator platform 140 (such as a computer system). As discussed further below, a user 150 inputs telephone profile activation information using the remote profile activator 110. This telephone profile activation information may include, for example, calendar information events (such as appointments and meetings) and the duration of the events in the calendar application. In a preferred embodiment where the remote profile activator is a calendar application, the telephone profile activation information is entered into the calendar application using an input device (such as a keyboard) connected to a computer. In alternate embodiments, the calendar application may reside directly on the telephone 120. In this alternate embodiment, the communication network 130 is contained within the telephone 120 and the remote profile activator platform 140 is the telephone 120.

Once the user 150 inputs the telephone profile activation information the remote profile activator 110 transmits the telephone profile activation information (including, for example the calendar information) to the telephone 120 over the communication network 130 (box 160). Firmware within the telephone 120 receives this profile activation information (box 170) and automatically activates the desired profile prior to the associated event based on the telephone profile activation information. Activation occurs at some predetermined time specified by the user, which can be, for example, prior to the event, at the exact time of the event or even slightly after the even has occurred.

Some embodiments of the present invention use a calendar application as the remote profile activator 110 and include a feature whereby the user 150 may update calendar information from the telephone 120. This updated calendar information may be transmitted (box 180) back to the calendar application using the communication network 130. The calendar application receives the updated calendar information (box 190) and updates the calendar information within the calendar application so that calendar information on both the calendar application and the telephone are synchronized. Thus, the user 150 can update calendar information contained in the calendar application using the telephone 120 if, for example, a scheduled meeting has been canceled or was concluded early. In this manner, the user 150 can ensure that the calendar information contained by the calendar application and the telephone 120 remain synchronized.

Remote activation of the telephone 120 by the remote profile activator 110 occurs through the communication network 130. The communication network 130 can be any type of network that provides an access path (either directly or indirectly) from the remote profile activator 110 to the telephone 120. In other words, the communication network 130 provides a means for the telephone 120 to receive the telephone profile activation information from the remote profile activator 110. By way of example, the remote profile activator 110 may be a calendar application residing on a computer that dials the telephone 120 directly and transfers telephone profile activation information. Dialing the telephone 120 directly, however, may not be available (such as if the telephone 120 is a mobile telephone and is turned off). In this case, the telephone profile activation information may be routed through the carrier (or mobile telephone company) of the telephone 120 and stored by the carrier for later distribution to the telephone 120. When the mobile telephone 120 is turned on it receives and processes the stored telephone profile activation information. In addition, this embodiment increases security by ensuring that only authorized persons can send telephone profile activation information to the telephone 120. For example, the telephone 120 can be enabled to accept remote activation of profiles and users authorized to remotely activate profiles on the telephone 120 can be specified.

Figure 2:
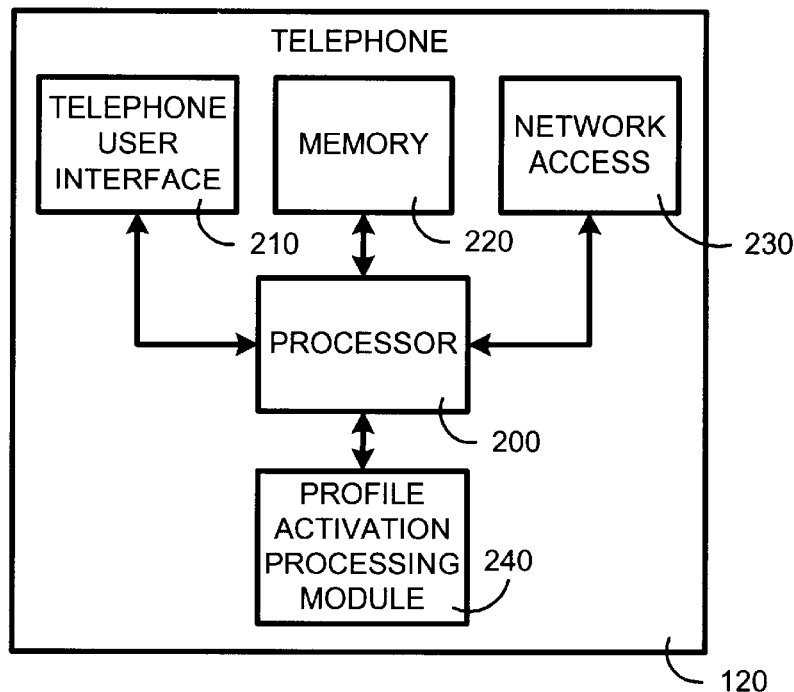
FIG. 2 illustrates a telephone incorporating the present invention.

FIG. 2 illustrates the telephone of FIG. 1 incorporating the present invention. The telephone 120 includes a processor 200, a user interface 210, memory 220 and a network access 230. The processor provides processing capability for the telephone 120 and the telephone user interface 210 provides a user with access to the telephone's 120 features and functions. Moreover, the memory 220 provides a storage area for data and the network access 230 provides a communication connection to other devices. A profile activation processing module 240 enables the telephone 120 to process and manage telephone profile activation information in an intelligent manner. Both the memory 220 and the profile activation processing module 240 enable the telephone 120 to store and sequence multiple telephone profile requests.

Figure 3:
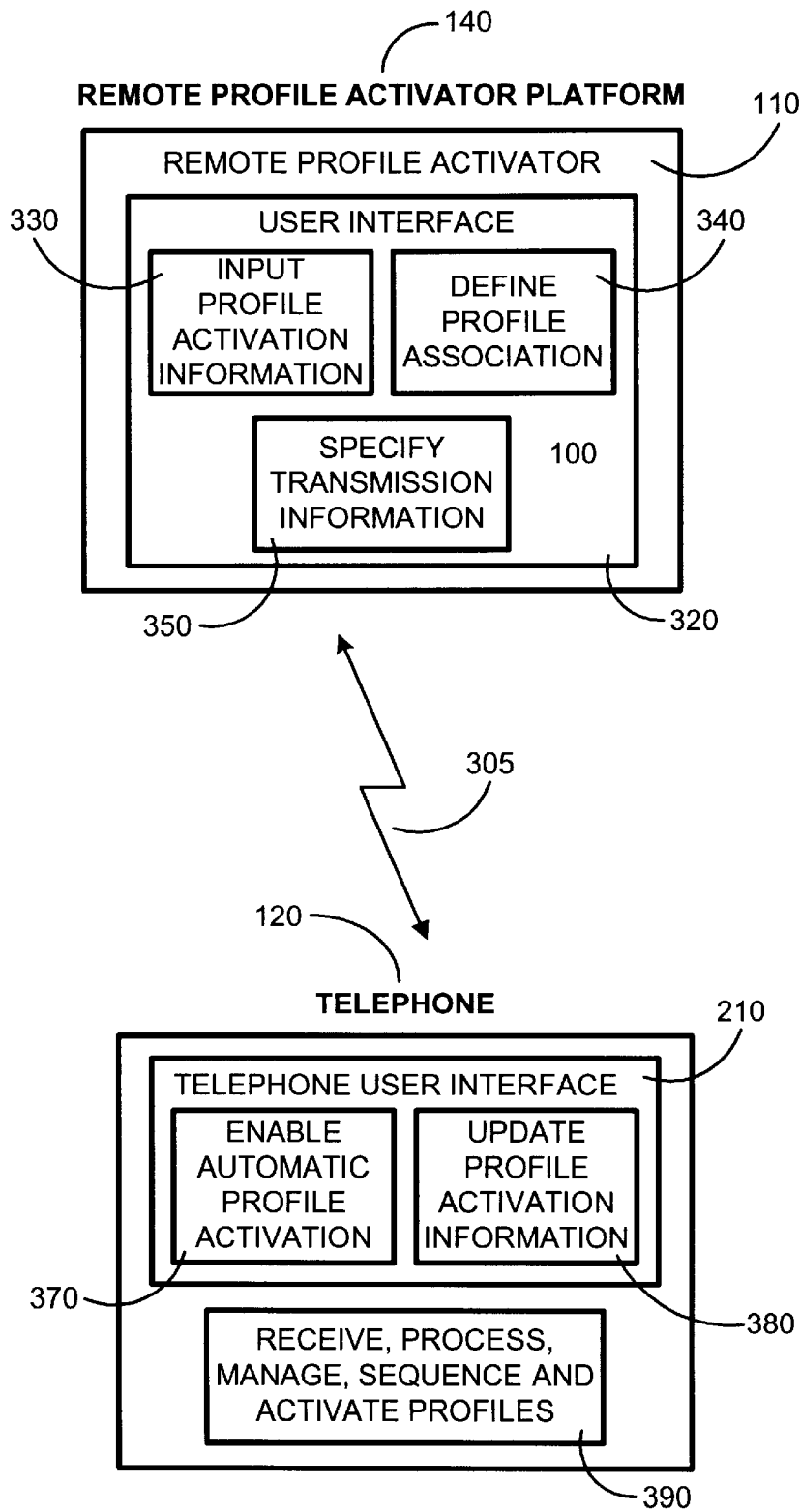
FIG. 3 is a block diagram illustrating components of the present invention.

FIG. 3 is a block diagram illustrating components of the telephone profile activation system 100 of the present invention. In general, the system 100 includes the remote profile activator platform 140 on which resides the remote profile activator 110, the telephone 120 and a communication channel 305 (such as the communication network 130 shown in FIG. 1). The communication channel 305 allows the remote profile activator 110 and the telephone 120 to communicate with each other and exchange information (such as telephone profile activation information).

The remote profile activator 110 includes a user interface (UI) 320 that allows the user to interface with the remote profile activator 110. In order to facilitate the input of information from by the user into the remote profile activator 110, the UI 320 includes menu items that allow the user to input telephone profile activation information (box 330), define profile associations (box 340) and specify transmission information (box 350). For example, in a preferred embodiment the user uses the UI 320 to input calendar information including specific events and defines telephone profile associations so that an event has an associated desired telephone. In addition, the UI 320 permits the user to specify how often or at what times the user would like the remote profile activator 110 to transmit to the telephone profile activation information to the telephone 120. If several profiles are transmitted to the telephone 120 the telephone stores these profiles in memory and sequences the profiles for activation.

The telephone user interface 210 of the telephone 120 includes an option to enable the automatic profile activation (box 370). When enabled, the telephone 120 is capable of receiving telephone profile activation information from the remote profile activator 110 and using this information to automatically activate a desired profile. In addition, the telephone user interface 210 allows the user to update telephone profile information (box 380) so, for example, calendar information on the calendar application remains synchronized with calendar information on the telephone 120. As discussed above, the telephone 120 also includes the profile activation processing module 240 that is able to intelligently receive, process, manage, sequence and activate desired telephone profiles (box 390).

III. General Operation

In general, the method of the present invention remotely and automatically activates a user's telephone profile as specified by the user. In a preferred embodiment, the user schedules events using a calendar application and the calendar application automatically selects and activates a desirable profile for the telephone based on the user's predetermined settings. Throughout a calendar period, the user's telephone profile is selected and activated based on the user's scheduling input to the calendar application. This selection and activation occurs automatically and without manual intervention.

Figure 4:
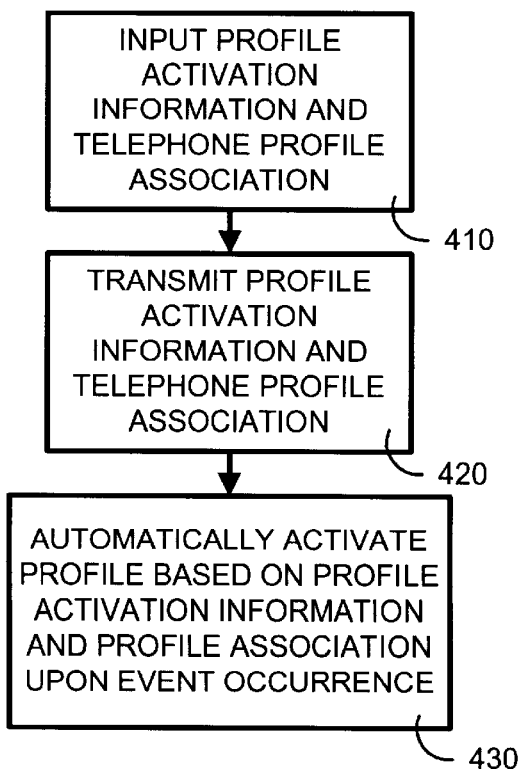
FIG. 4 is a general flow diagram of the operation of the present invention.

FIG. 4 is a general flow diagram of the operation of the present invention. A user schedules events over a calendar period by inputting telephone profile activation information into the remote profile activator 110 and associates predefined telephone profiles with each event (box 410). The calendar period may be any time period desired by the user, such as the date, the time and the duration of an event. Telephone profile activation information (such as timing and scheduling of events and a telephone profile association) is transmitted to the telephone (box 420). The telephone profile association instructs the telephone 120 to enable or disable certain features and functions (such as call-waiting or vibration) so as to operate in a desired manner during the event. For example, a scheduled meeting may have an associated profile whereby the telephone operates in a meeting profile, which may send all incoming calls to voice mail. The telephone receives the telephone profile activation information and telephone profile association and, based on these instructions, automatically activates the appropriate profile upon the occurrence of a corresponding event. Thus, the present invention remotely and automatically activates the desired telephone profile so that the telephone behaves in a desired manner during a scheduled event.

IV. Operational Details

Figure 5:
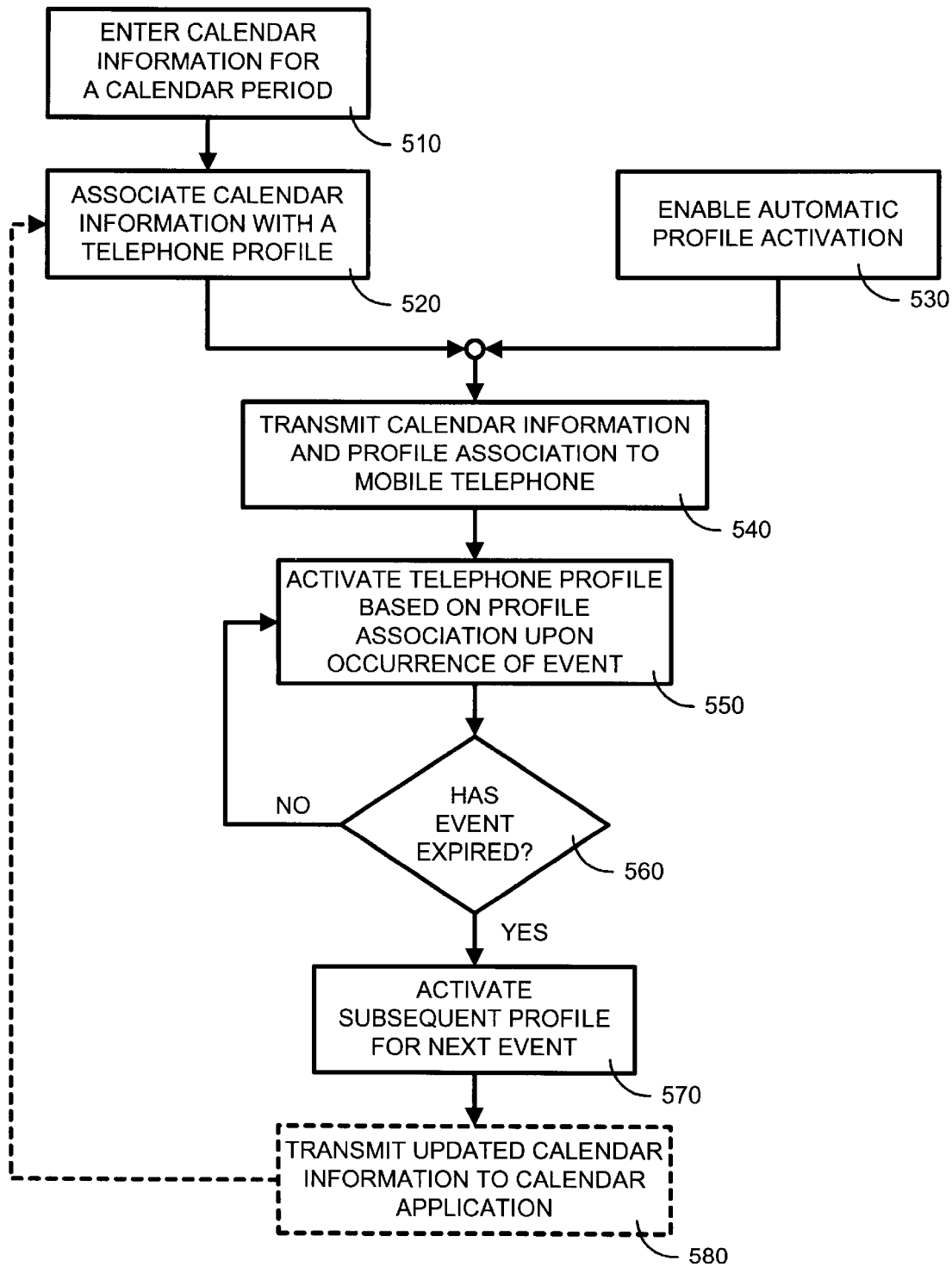
FIG. 5 is a detailed flow diagram illustrating a preferred embodiment of the present invention.

FIG. 5 is a detailed flow diagram illustrating a preferred embodiment of the present invention whereby the telephone is a mobile telephone. It should be noted that the present invention may be implemented in a variety of ways and actual implementation may vary from the following description. In this preferred embodiment, the present invention includes a calendar application that allows the user to enter calendar information for a certain calendar period (box 510). This permits the user to schedule upcoming events for a certain period of time (such as daily). The calendar application enables the user to specify a mobile telephone recipient, typically by using the telephone number of the mobile telephone. It should be noted that the service provider for the mobile telephone must allow for telephone profile activation messages to be sent to the telephone.

The calendar application also permits the user to associate calendar information with a telephone profile (box 520). This means that the user can choose which profile should be used during a certain event. For example, a meeting scheduled in the calendar application may be associated with a telephone profile that is suitable for a meeting, such as having the telephone vibrate instead of ring for an incoming call or go directly to voice mail. Thus, when the user schedules an event into the calendar application a profile association is created to send the mobile telephone the appropriate telephone settings. In addition, in order for the mobile telephone to be activated by the calendar application, the user must first enable automatic profile activation (box 530) on the mobile telephone. Typically, the mobile telephone contains a menu option that permits enabling of the automatic profile activation by the remote profile activator 110 (such as a calendar application).

Calendar information and profile associations are transmitted from the calendar application to the mobile telephone (box 540). Calendar information includes, for example, the schedule of event, the type of event scheduled and the duration of the event. Generally, the mobile telephone's firmware is able to receive the transmitted information as well as activate the profile for the telephone. The calendar application may transmit telephone profile activation information (including calendar information and profile associations) at any time and frequency specified by the user. In this preferred embodiment, the telephone profile activation information is transmitted to the mobile telephone approximately ten minutes prior to an event. This requires the mobile telephone to have less memory available to store the information. Alternatively, the telephone profile activation information may be transmitted, for example, anytime the calendar application is updated (such as hourly, daily or weekly or as needed or desired by the user).

The telephone profile associated with an event is activated by the mobile telephone upon the occurrence of the event (box 550). In particular, the firmware on the telephone automatically activates the appropriate profile based on the profile association. The present invention also accounts for time zone changes. Therefore, if the calendar information is entered in the calendar application based on a local time zone and the mobile telephone is with the user in a different time zone, then a time conversion is made so that the telephone profiles are activated based on the time zone where the user is located.

The invention then determines whether the event has expired (box 560). Expiration of the event may occur, for example, by completion or cancellation the event. If the event has not expired, the invention keeps the current activated profile. Otherwise, if the event has expired, the mobile telephone activates a subsequent profile for the next event based on the calendar information and profile associations (box 570). If there is not subsequent profile defined, then the mobile telephone reverts to a default profile.

In an alternate embodiment (as shown by the dashed lines), the present invention also includes a feature that permits the user to update calendar information on the mobile telephone and have the firmware on the telephone transmit this updated calendar information to the calendar application (box 580). In addition, the user has the ability to change the current profile to another profile. Both these capabilities are useful if there is a change in the schedule. For example, if a meeting is shorter than scheduled (or even canceled), the user has the capability to change the profile from a meeting profile to a normal profile. Moreover, the user can alter the calendar information using the mobile telephone and transmit this updated calendar information to the calendar application. This ensures that the calendar information of the calendar application and the mobile telephone are constantly synchronized. This synchronization may occur as often as desired by the user. In a preferred embodiment, synchronization of calendar information between the calendar application and the mobile telephone occurs whenever a change is made to the calendar information on the mobile telephone.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for remotely activating a profile of a telephone, comprising:

creating at least one telephone profile that controls at least one function of the telephone;

inputting telephone profile activation information that associates an event scheduled on a calendar application of an external electronic device with the at least one telephone profile;

transmitting the telephone profile activation information and the at least one telephone profile to the telephone; and automatically activating the at least one telephone profile by said telephone when the scheduled event occurs.

2. The method of claim 1, wherein inputting is performed using a remote profile activator.

3. The method of claim 2, wherein the external electronic device is a computer and the remote profile activator is a calendar application operating on the computer.

4. The method of claim 2, wherein the remote profile activator is at least one of: (a) electronic mail; (b) telephone; (d) digital messaging; (e) voice response system; (f) online service provider.

5. The method of claim 2, further comprising:

using the telephone to update telephone profile activation information; and transmitting the updated telephone profile activation information to the remote profile activator.

6. The method of claim 1, wherein telephone profile activation information comprises a plurality of telephone profiles.

7. The method of claim 1, further comprising defining the profile using features and functions of the telephone.

8. The method of claim 1, wherein the telephone is capable of receiving, storing and sequencing multiple profiles.

9. A method for automatically activating certain functions of a telephone, comprising:

associating calendar events of a calendar application located on an external electronic device with telephone profiles that control functions of the telephone;

transmitting the calendar information and the telephone profiles to the telephone; and automatically activating the profiles by said telephone when associated events of the calendar application occurs.

10. The method of claim 9, wherein the external electronic device is a computer and the calendar application operates on the computer and the event includes a duration of the event.

11. The method of claim 9, wherein associating calendar events of the calendar application is created by associating predetermined scheduled events with at least one profile.

12. The method of claim 11, wherein associating calendar events of the calendar application with the telephone profiles is created using the calendar application.

13. The method of claim 9, further comprising generating a plurality of profiles for a corresponding plurality of telephones for the event.

14. A method for remotely activating a telephone certain functions of a telephone, comprising:

associating scheduled events of a calendar application operating on an external electronic device with telephone profiles to define telephone profile activation information and telephone profile associations;

receiving the telephone profile activation information and the telephone profile association from the calendar application; and activating a one of the telephone profiles by said telephone on the telephone based on the telephone profile activation information and the telephone profile association.

15. The method of claim 14, wherein the telephone receives the telephone profile activation information and the telephone profile association from an authorized remote profile activator.

16. The method of claim 14, wherein the telephone is capable of receiving and storing a plurality of telephone profiles.

17. The method of claim 16, wherein the telephone is capable of sequencing the plurality of telephone profiles such that each profile is activated at a desired time.

18. The method of claim 16, wherein the telephone is capable of sequencing the plurality of telephone profiles such that each profile is activated for a desired duration of time.

* * * * *